(12) United States Patent
Xu et al.

(10) Patent No.: US 9,965,078 B2
(45) Date of Patent: May 8, 2018

(54) PRESSURE-SENSING TOUCH SYSTEM AND METHOD AND DISPLAY SYSTEM

(71) Applicant: BOE TECHNOLOGY GROUP CO., LTD., Beijing (CN)

(72) Inventors: Zhiqiang Xu, Beijing (CN); Xiangxiang Zou, Beijing (CN); Xuefei Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days. days.

(21) Appl. No.: 15/533,079

(22) PCT Filed: Jun. 22, 2016

(86) PCT No.: PCT/CN2016/086694
§ 371 (c)(1),
(2) Date: Jun. 5, 2017

(87) PCT Pub. No.: WO2017/148051
PCT Pub. Date: Sep. 8, 2017

(65) Prior Publication Data
US 2018/0052555 A1    Feb. 22, 2018

(30) Foreign Application Priority Data
Mar. 3, 2016    (CN) .......................... 2016 1 0119977

(51) Int. Cl.
G06F 3/041    (2006.01)
G06F 3/042    (2006.01)
(Continued)

(52) U.S. Cl.
CPC ......... *G06F 3/0414* (2013.01); *G02B 6/0031* (2013.01); *G02F 1/13338* (2013.01); *G02F 1/133602* (2013.01); *G06F 3/042* (2013.01)

(58) Field of Classification Search
CPC ..... G06F 3/0414; G06F 3/042; G02B 6/0031; G02F 1/13338; G02F 1/133602
See application file for complete search history.

(56) References Cited

U.S. PATENT DOCUMENTS

| | | | | |
|---|---|---|---|---|
| 4,830,461 A | * | 5/1989 | Ishiharada | ............. B29C 35/06 385/13 |
| 2008/0011944 A1 | * | 1/2008 | Chua | ................... G02B 6/0035 250/227.24 |

(Continued)

FOREIGN PATENT DOCUMENTS

| | | |
|---|---|---|
| CN | 101441541 A | 5/2009 |
| CN | 104220964 A | 12/2014 |
| CN | 105009046 A | 10/2015 |

OTHER PUBLICATIONS

Search Report from International Application No. PCT/CN2016/086694 dated Dec. 14, 2016.

(Continued)

*Primary Examiner* — Ariel Balaoing
(74) *Attorney, Agent, or Firm* — Calfee, Halter & Griswold LLP (57) ABSTRACT

A pressure-sensing touch system for recognition of a touch event caused by a pressure applied at a touch position is disclosed which includes a light guide plate, a light output plate, a light source subsystem, a plurality of interference plates, a plurality of detectors and a controller. Upon application of the pressure at the touch position, a change in an intensity distribution of output light exiting from two through-openings of the interference plate occurs. The plurality of detectors are configured to detect the change. The controller is configured to recognize the touch event based on the detecting by the plurality of detectors. Also disclosed are a pressure-sensing touch method and a display system.

20 Claims, 3 Drawing Sheets

(51) Int. Cl.
*G02F 1/1333* (2006.01)
*G02F 1/1335* (2006.01)
*F21V 8/00* (2006.01)

(56) References Cited

U.S. PATENT DOCUMENTS

| | | | |
|---|---|---|---|
| 2008/0029691 A1* | 2/2008 | Han | G06F 3/04883 |
| | | | 250/224 |
| 2009/0128508 A1* | 5/2009 | Sohn | G06F 3/0421 |
| | | | 345/173 |
| 2009/0136192 A1* | 5/2009 | Shimizu | G02B 6/12004 |
| | | | 385/131 |
| 2012/0229418 A1 | 9/2012 | Schwartz et al. | |
| 2012/0268427 A1* | 10/2012 | Slobodin | G06F 3/042 |
| | | | 345/175 |
| 2013/0285970 A1 | 10/2013 | Ahn et al. | |
| 2014/0362053 A1* | 12/2014 | Holmgren | G06F 3/0421 |
| | | | 345/175 |
| 2015/0091875 A1 | 4/2015 | Li | |
| 2015/0261371 A1 | 9/2015 | Shenzhen | |
| 2017/0031527 A1* | 2/2017 | Dearn | G06F 3/0416 |
| 2017/0262134 A1* | 9/2017 | Eriksson | G06F 3/041 |
| 2017/0269787 A1* | 9/2017 | Eriksson | G06F 3/041 |
| 2017/0285790 A1* | 10/2017 | Barel | G06F 3/0412 |

OTHER PUBLICATIONS

First Office Action for Chinese Patent Application No. 201610119977.4 dated Dec. 4, 2017.

\* cited by examiner

PRESSURE-SENSING TOUCH SYSTEM AND METHOD AND DISPLAY SYSTEM

CROSS-REFERENCE TO RELATED APPLICATIONS

The present application is the U.S. national phase entry of PCT/CN2016/086694, with an international filing date of Jun. 22, 2016, which claims the benefit of Chinese Patent Application No. 201610119977.4, filed on Mar. 3, 2016, the entire disclosures of which are incorporated herein by reference.

TECHNICAL FIELD

The present disclosure relates to the field of display technologies, and particularly to a pressure-sensing touch system and method, as well as a display system.

BACKGROUND

Touch input devices have been widely used in human-machine interaction applications such as smart phones, e-books, tablets and laptops. The touch input device is generally based on capacitive touch sensors which are competent in sensing of a position and track of a touch operation, but not in detection of a pressure applied in a pressing operation.

Touch input devices based on pressure sensors have been developed. Although they are effective, there is still a need for alternatives to traditional touch input devices that are based on pressure sensors.

SUMMARY

It would be advantageous to achieve an optically-based scheme to sense a pressure applied at a touch position, thereby recognizing a touch event.

According to certain exemplary embodiments of the present disclosure, a pressure-sensing touch system for recognition of a touch event caused by a pressure applied at a touch position is provided. The system comprises a light guide plate having an upper surface, a lower surface and at least one light incident surface, and a light output plate arranged at the lower surface and having a plurality of first through-openings in a thickness direction thereof. The light guide plate and the light output plate are bendable upon application of the pressure at the touch position. The system further comprises a light source subsystem arranged at the at least one light incident surface and configured to direct light into the light guide plate to provide output light via the plurality of through-openings, and a plurality of interference plates each having two second through-openings in a thickness direction thereof. Each of the plurality of interference plates is arranged opposite to a respective one of the plurality of first through-openings such that at least part of the output light exiting from the respective first through-opening passes through the two second through-openings to interfere with each other. The plurality of interference plates are arranged such that bending of the light guide plate and the light output plate causes a change in a position of a corresponding one of the interference plates upon application of the pressure at the touch position. The system further comprises a plurality of detectors each arranged opposite to a respective one of the plurality of interference plates for receipt of the at least part of the output light exiting from the two through-openings of the respective interference plate.

Each of the plurality of detectors is configured to detect a change in an intensity distribution of the output light, the change in the intensity distribution being caused by the change in the position of the interference plate corresponding to the detector, the change in the position of the interference plate comprising a decrease in a distance from the interference plate to the detector. The system further comprises a controller operably connected to the plurality of detectors and configured to recognize the touch event based on the detecting by the plurality of detectors.

In certain exemplary embodiments, the first through-openings and the second through-openings are through-holes.

In certain exemplary embodiments, the first through-openings and the second through-openings are slits.

In certain exemplary embodiments, the plurality of interference plates are incorporated into an integral structure.

In certain exemplary embodiments, the plurality of detectors are incorporated into an integral structure.

In certain exemplary embodiments, the plurality of detectors are arranged in an array.

In certain exemplary embodiments, each of the plurality of detectors comprises a CMOS or CCD array.

In certain exemplary embodiments, the light source subsystem comprises at least one light source.

In certain exemplary embodiments, the at least one light source is selected from the group consisting of an LED, a laser diode and a VCSEL.

In certain exemplary embodiments, the controller is further configured to recognize the touch position based on from which detector or detectors the change in the intensity distribution is detected.

In certain exemplary embodiments, the controller is further configured to recognize a level of the pressure based on a magnitude of the change in the intensity distribution.

According to certain exemplary embodiments of the present disclosure, a display system is provided which comprises a pressure-sensing touch system as described above and a display panel arranged on the light guide plate. The touch event is caused by a pressure applied at a touch position on the display panel.

In certain exemplary embodiments, the light output plate is a reflector plate.

In certain exemplary embodiments, the display system further comprises a diffuser plate arranged between the upper surface of the light guide plate and the display panel.

According to certain exemplary embodiments of the present disclosure, a method of recognizing a touch event caused by a pressure applied at a touch position is provided. The method comprises providing output light at a plurality of first through-openings of a light output plate. The light output plate is bendable upon application of the pressure at the touch position. The method further comprises providing a plurality of interference plates. Each of the interference plates has two second through-openings in a thickness direction thereof and is arranged opposite to a respective one of the plurality of first through-openings such that at least part of the output light exiting from the respective first through-opening passes through the two second through-openings to interfere with each other. The method further comprises bending the light output plate by applying the pressure at the touch position, thereby causing a change in a position of a corresponding one of the interference plates; detecting, by a detector, a change in an intensity distribution of the output light exiting from the two through-openings of the corresponding interference plate, the change in the intensity distribution being caused by the change in the position of the corresponding interference plate, the change in the position of the corresponding interference plate comprising a decrease in a distance from the interference plate to the detector; and recognizing the touch event based on the detected change in the intensity distribution.

These and other aspects of the present disclosure will be apparent from and elucidated with reference to the embodiment(s) described hereinafter.

DETAILED DESCRIPTION

Embodiments of the present disclosure are described below in detail in connection with the accompanying drawings. It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 1A:
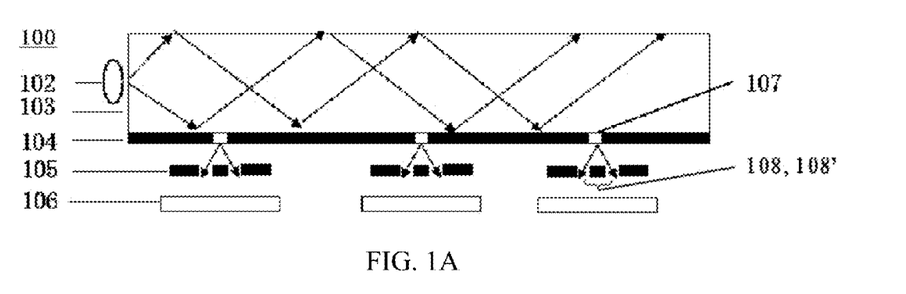
FIG. 1A is a cross-sectional view schematically showing a structure of a pressure-sensing touch system according to an embodiment of the present disclosure.

FIG. 1A is a cross-sectional view schematically showing a structure of a pressure-sensing touch system 100 according to an embodiment of the present disclosure. The pressure-sensing touch system 100 may be used alone as a touch input device (e.g., a touchpad) or used in combination with a display panel as a touch screen (discussed later).

As shown in the figure, the pressure-sensing touch system 100 comprises a light guide plate 103, a light output plate 104, a light source subsystem 102, a plurality of interference plates 105, a plurality of detectors 106 and a controller (not shown).

The light guide plate 103 has an upper surface, a lower surface and at least one light incident surface. The light guide plate 103 may be a light guiding component that is usually used in a backlight module of a liquid crystal display. Examples of the light guide plate 103 include a sheet made of polymethyl methacrylate (PMMA) or polycarbonate (PC) material. Due to its relatively small thickness, the light guide plate 103 is bendable, for example, in the case of a touch event where a certain magnitude of pressure is applied at a touch position (e.g., on the upper surface of the light guide plate 103).

The light output plate 104 is arranged at the lower surface of the light guide plate 103 and is provided with a plurality of first through-openings 107 in a thickness direction thereof. The light guide plate 104 is bendable upon application of the pressure at the touch position.

The light source subsystem 102 is arranged at the at least one light incident surface of the light guide plate 103 and is configured to direct light into the light guide plate 103 to provide output light via the plurality of through-openings 107. In certain exemplary embodiments, the light source subsystem 102 may comprise at least one light source. Examples of the light source include an LED, a laser diode, a VCSEL, and so on. In certain exemplary embodiments, a plurality of light sources may be arranged at one of the light incident surfaces of the light guide plate 103. In other embodiments, a plurality of light sources may be arranged respectively at different light incident surfaces of the light guide plate 103.

In certain exemplary embodiments, the pressure-sensing touch system 100 comprises a plurality of interference plates 105. Each of the interference plates 105 has two second through-openings 108, 108' in a thickness direction thereof. Each of the plurality of interference plates 105 is arranged opposite to a respective one of the plurality of first through-openings 107 such that at least part of the output light exiting from the respective first through-opening passes through the two second through-openings 108, 108' to interfere with each other. For the configuration as shown in FIG. 1A, the interference of the output light may include double-hole interference or double-slit interference. In embodiments where the double-hole interference is used, the first through-openings 107 and the second through-openings 108, 108' are holes. In embodiments where the double-slit interference is used, the first through-openings 107 and the second through-openings 108, 108' are slits.

In addition, the plurality of interference plates 105 are arranged such that bending of the light guide plate 103 and the light output plate 104 causes a change in a position of a corresponding one of the interference plates 105 upon application of the pressure at the touch position. In certain exemplary embodiments, the interference plates 105 may be secured to the light output plate 104 by way of support components (not shown), for example. In this way, a local bending of the light output plate 104 causes a displacement of one or more corresponding interference plates 105. An example of the support component may be a post that protrudes from the interference plate 105 and extends to the light output plate 104 (or vice versa). Another example of the support component may be adhesive applied around the periphery of the interference plate 105, which after being cured provides a gap between the interference plate 105 and the light output plate 104. Other examples of the support component include a spacer adhered between the interference 105 and the light output plate 104.

In certain exemplary embodiments, the plurality of interference plates 105 may be incorporated into an integral structure. I.e., the plurality of interference plates 105 are incorporated as a whole into one interference plate on which a plurality of pairs of second through-openings 108, 108' are still provided that correspond one-to-one to the plurality of first through-openings 107. This is advantageous for manufacturing and amounting of the interference plates. A respective support component may be arranged adjacent to each pair of second through-openings 108, 108' such that the bending of different portions of the light output plate 104 causes a change in the position of one or more corresponding pairs of second through-openings 108, 108'.

In certain exemplary embodiments, the pressure-sensing touch system 100 comprises a plurality of detectors 106. Each of the detectors 106 is arranged opposite to a respective one of the plurality of interference plates 105 for receipt of the at least part of the output light exiting from the two through-openings 108, 108' of the respective interference plate. The detector 106 may have a light-sensing surface on which the interfered output light impinges to form an interference pattern indicative of an intensity distribution of the output light. Specifically, the detector 106 may have a photodiode or any other type of photo-sensor. In certain exemplary embodiments, the detector 106 may comprise a CMOS or CCD array, in which case the interference pattern may be imaged and picked up by the detector 106.

As described above, the bending of the light output plate 104 (and potentially the light guide plate 103) causes a change in the position of the corresponding interference plate(s) 105. For example, the interference plate 105 may move toward the detector 106 such that the distance therebetween decreases. The decreased distance causes a variation in the interference pattern that is projected on the light-sensing surface of the detector 106 such that the intensity distribution detected by the detector 106 changes. Each of the plurality of detectors 106 is configured to detect the change in the intensity distribution of the output light.

Figure 1B:
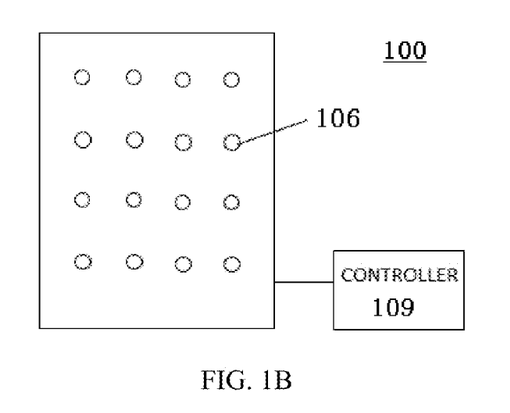
FIG. 1B is a block diagram schematically showing a structure of a pressure-sensing touch system according to an embodiment of the present disclosure.

FIG. 1B is a block diagram schematically showing a structure of a pressure-sensing touch system according to an embodiment of the present disclosure. As shown in FIG. 1B, the pressure-sensing touch system 100 comprises a controller 109 operably connected to the plurality of detectors 106 and configured to recognize the touch event based on the detecting by the plurality of detectors 106.

The functionality of touch event recognition as described in connection with the above and following embodiments may be embodied directly in the controller 109, in a software module executed by the controller 109, or in a combination thereof. The software module may reside in RAM memory, flash memory, ROM memory, EPROM memory, EEPROM memory, registers, hard disk, a removable disk, a CD-ROM, or any other form of storage medium known in the art. The exemplary storage medium is coupled to the controller 109 such the controller 109 can read information from, and write information to, the storage medium. In an alternative, the storage medium may be integral to the controller 109. The controller 109 and the storage medium may reside in an ASIC.

Specifically, the controller 109 may be configured to recognize the touch position based on from which detector(s) 106 the change in the intensity distribution is detected. The controller 109 may further be configured to recognize a level of the pressure based on a magnitude of the change in the intensity distribution. The functions performed by the controller 109 will be described later in more detail.

Although the plurality of detectors 106 are shown as arranged in an array, other embodiments are possible. For example, the plurality of detectors 106 may be incorporated into an integral structure such that their light-sensing surfaces are incorporated into a complete light-sensing surface. This is advantageous for the manufacturing and amounting of the detectors. In this case, the photosensitive elements (e.g., CMOS or CCD elements) may or may not cover the full area of this complete light-sensing surface.

Figure 2:
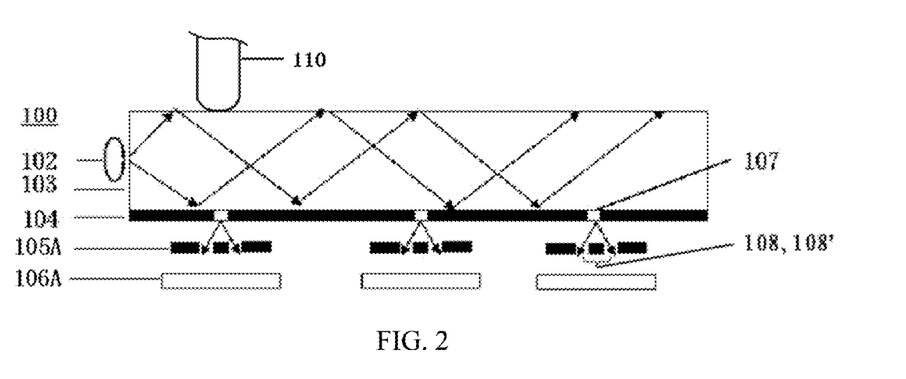
FIG. 2 is a schematic diagram showing the pressure-sensing touch system as shown in FIG. 1 when in a touch event.

FIG. 2 is a schematic diagram showing the pressure-sensing touch system 100 as shown in FIG. 1 when in a touch event. In this touch event, the user presses against the upper surface of the light guide plate 103 at a touch position using a touch object 110 (e.g., a finger or a stylus). As a result, the area of the light guide plate 103 and light output plate 104 that corresponds to the touch position is locally bent, leading to a change in the position of a corresponding interference plate 105A. As described above, the change causes a variation in the interference pattern projected on a detector 106A.

Figure 3:
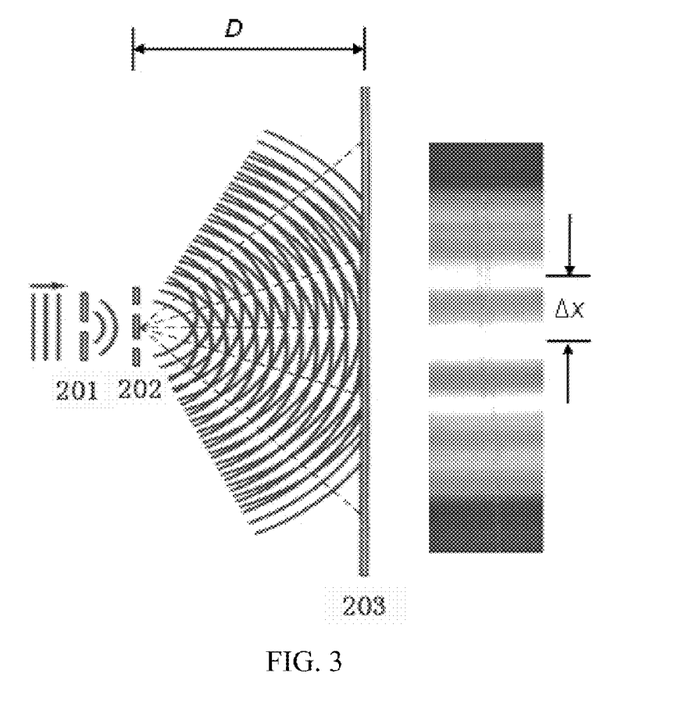
FIG. 3 schematically shows a principle of double-slit interference.

In the following how the interference pattern varies with the change in the position of the interference plate is illustrated in connection with FIG. 3. As shown in FIG. 3, the output light is provided by a baffle 201 having a slit and impinges on a baffle 202 having two slits (an interference plate). After passing through the two slits, the light wave forms two coherent wave sources, from which the light emitted overlaps each other in a space behind the baffle 202 and forms an interference pattern on a screen 203. In the case of white light, the interference pattern is an arrangement of fringes having different colors. In the case of monochromatic light, the interference pattern comprises a plurality of alternating bright fringes and dark fringes.

For the monochromatic light, a pitch of the bright fringes is calculated as follows:

$$\Delta x = \frac{\lambda D}{d}$$

where $\Delta x$ is the pitch of the fringes, D is a horizontal distance from the two slits to the screen, d is an interval between the two slits, and $\lambda$ is a wavelength of the monochromatic light.

For the white light, it can be regarded as a mixture of light with different wavelengths, among which red light has the largest wavelength. Therefore, the interference fringes of the red light have the broadest pitch such that the red fringe is located most exteriorly, while the middle fringe is mixed by fringes of light with different wavelengths and thus is white.

In either case, when the distance from the two slits to the screen decreases, the pith of the fringes decreases accordingly. In the touch event as shown in FIG. 2, a decrease in the distance between the interference plate 105A and the detector 106A (i.e., D) results in a decrease in the pith of the fringes $\Delta x$. That is, the intensity distribution changes. The touch event may be recognized based on the detected change in the intensity distribution. In certain exemplary embodiments, responsive to the change in the intensity distribution detected by the detector 106A, the controller 109 can determine that the area of the upper surface of the light guide plate 103 corresponding to the detector 106A is where the pressure is applied. In other words, the change in the intensity distribution is associated with the application of the pressure.

Additionally, the controller 109 may be configured to recognize a level of the pressure based on a magnitude of the change in the intensity distribution. This may be referred to as "multi-level pressure touch control" where different operations may be triggered by different levels of pressures. The level of the pressure may be indicated by the magnitude of the change in the pitch of the fringes $\Delta x$.

In certain exemplary embodiments, a correspondence between the magnitudes of the change in the pitch of the fringes $\Delta x$ and the levels of the pressure may be stored in advance, and the level of the pressure may be determined from the magnitude of the detected change in $\Delta x$. In an implementation, when the detected $\Delta x$ is within a first range the controller 109 may perform a first operation, and when the detected $\Delta x$ is within a second range the controller 109 may perform a second operation, and so on. In other words, the change in the intensity distribution is associated with the application of the pressure.

Described above are embodiments where the pressure-sensing touch system 100 is used alone as a touch input device. In the following embodiments where the pressure-sensing touch system 100 is used with a display panel are described in connection with FIG. 4.

Figure 4:
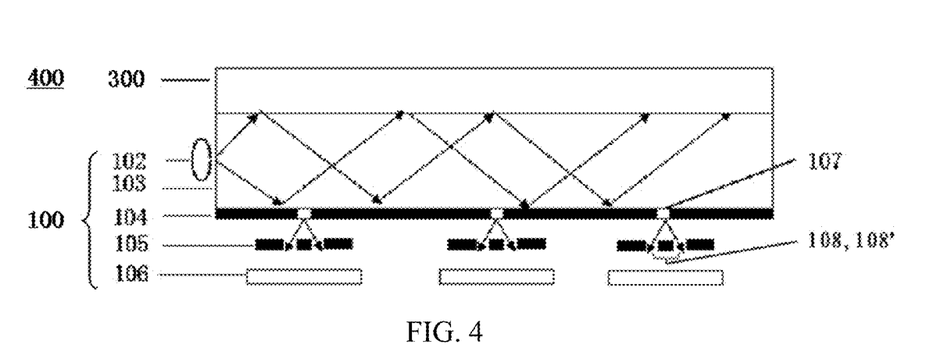
FIG. 4 is a cross-sectional view schematically showing a structure of a display system where the pressure-sensing touch system as shown in FIG. 1 is used with a display pane.

FIG. 4 is a cross-sectional view schematically showing a structure of a display system 400 where the pressure-sensing touch system 100 as shown in FIG. 1 is used with a display pane 300. This display system 400 may be regarded as a touch screen in which the display panel 300 is stacked on top of the pressure-sensing touch system 100.

By way of example, and not limitation, the display panel 300 may be a liquid crystal display panel. In certain exemplary embodiments, the display panel 300 may be an OLED-based display panel. Examples of the display panel 300 may further include flexible display panels. In the case of the liquid crystal display panel, the pressure-sensing touch system 100 may be regarded as a backlight module of the liquid crystal display. In this backlight module, the light output plate 104 is a reflector plate. As is known, a diffuser plate (not shown) may be arranged between the upper surface of the light guide plate 103 and the display panel 300.

Figure 5:
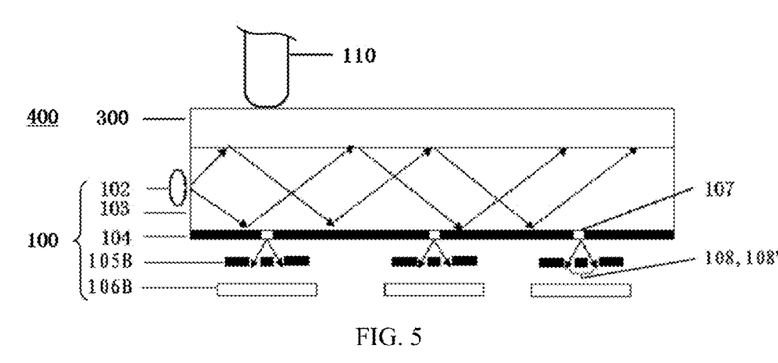
FIG. 5 is a schematic diagram showing the display system as shown in FIG. 4 when in a touch event.

FIG. 5 is a schematic diagram showing the display system 400 as shown in FIG. 4 when in a touch event. The display panel 300 has a relatively small thickness (e.g., a few millimeters or even smaller) such that it bends when a pressure is applied at a touch position on the display panel 300. The bending of the display panel 300 would cause bending of the light guide plate 103 and, in turn, a change in the position of the interference plate 105.

In this touch event, the user presses against the surface of the display panel 300 at a touch position using a touch object 110 (e.g., a finger or a stylus). As a result, the position of a corresponding interference plate 105B will change, and the interference pattern projected on a detector 106B will change accordingly. Recognition of the touch event is similar to that described above with respect to FIG. 2, and thus is not detailed here.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosure set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A pressure-sensing touch system for recognition of a touch event caused by a pressure applied at a touch position, comprising:
    a light guide plate having an upper surface, a lower surface and at least one light incident surface;
    a light output plate arranged at the lower surface and having a plurality of first through-openings in a thickness direction thereof, wherein the light guide plate and the light output plate are bendable upon application of the pressure at the touch position;
    a light source subsystem arranged at the at least one light incident surface and configured to direct light into the light guide plate to provide output light via the plurality of through-openings;
    a plurality of interference plates each having two second through-openings in a thickness direction thereof, wherein each of the plurality of interference plates is arranged opposite to a respective one of the plurality of first through-openings such that at least part of the output light exiting from the respective first through-opening passes through the two second through-openings to interfere with each other, and wherein the plurality of interference plates are arranged such that bending of the light guide plate and the light output plate causes a change in a position of a corresponding one of the interference plates upon application of the pressure at the touch position;

a plurality of detectors each arranged opposite to a respective one of the plurality of interference plates for receipt of the at least part of the output light exiting from the two through-openings of the respective interference plate, wherein each of the plurality of detectors is configured to detect a change in an intensity distribution of the output light, the change in the intensity distribution being caused by the change in the position of the interference plate corresponding to the detector, the change in the position of the interference plate comprising a decrease in a distance from the interference plate to the detector; and a controller operably connected to the plurality of detectors and configured to recognize the touch event based on the detecting by the plurality of detectors.

2. The pressure-sensing touch system of claim 1, wherein the first through-openings and the second through-openings are through-holes.

3. The pressure-sensing touch system of claim 1, wherein the first through-openings and the second through-openings are slits.

4. The pressure-sensing touch system of claim 1, wherein the plurality of interference plates are incorporated into an integral structure.

5. The pressure-sensing touch system of claim 1, wherein the plurality of detectors are incorporated into an integral structure.

6. The pressure-sensing touch system of claim 1, wherein the plurality of detectors are arranged in an array.

7. The pressure-sensing touch system of claim 1, wherein each of the plurality of detectors comprises a CMOS or CCD array.

8. The pressure-sensing touch system of claim 1, wherein the light source subsystem comprises at least one light source.

9. The pressure-sensing touch system of claim 8, wherein the at least one light source is selected from the group consisting of an LED, a laser diode and a VCSEL.

10. The pressure-sensing touch system of claim 1, wherein the controller is further configured to recognize the touch position based on from which detector or detectors the change in the intensity distribution is detected.

11. The pressure-sensing touch system of claim 1, wherein the controller is further configured to recognize a level of the pressure based on a magnitude of the change in the intensity distribution.

12. A display system comprising:
a pressure-sensing touch system of claim 1; and
a display panel arranged on the light guide plate,
wherein the touch event is caused by a pressure applied at a touch position on the display panel.

13. The display system of claim 12, wherein the light output plate is a reflector plate.

14. The display system of claim 12, further comprising a diffuser plate arranged between the upper surface of the light guide plate and the display panel.

15. A method of recognizing a touch event caused by a pressure applied at a touch position, comprising:
providing output light at a plurality of first through-openings of a light output plate, wherein the light output plate is bendable upon application of the pressure at the touch position;
providing a plurality of interference plates, wherein each of the interference plates has two second through-openings in a thickness direction thereof and is arranged opposite to a respective one of the plurality of first through-openings such that at least part of the output light exiting from the respective first through-opening passes through the two second through-openings to interfere with each other;
bending the light output plate by applying the pressure at the touch position, thereby causing a change in a position of a corresponding one of the interference plates;
detecting, by a detector, a change in an intensity distribution of the output light exiting from the two through-openings of the corresponding interference plate, the change in the intensity distribution being caused by the change in the position of the corresponding interference plate, the change in the position of the corresponding interference plate comprising a decrease in a distance from the interference plate to the detector; and
recognizing the touch event based on the detected change in the intensity distribution.

16. A display system comprising:
a pressure-sensing touch system of claim 2; and
a display panel arranged on the light guide plate,
wherein the touch event is caused by a pressure applied at a touch position on the display panel.

17. A display system comprising:
a pressure-sensing touch system of claim 3; and
a display panel arranged on the light guide plate,
wherein the touch event is caused by a pressure applied at a touch position on the display panel.

18. A display system comprising:
a pressure-sensing touch system of claim 3; and
a display panel arranged on the light guide plate,
wherein the touch event is caused by a pressure applied at a touch position on the display panel.

19. A display system comprising:
a pressure-sensing touch system of claim 4; and
a display panel arranged on the light guide plate,
wherein the touch event is caused by a pressure applied at a touch position on the display panel.

20. A pressure-sensing touch panel comprising:
a light guide plate having an upper surface, a lower surface and at least one light incident surface;
a light output plate arranged at the lower surface and having a plurality of first through-openings in a thickness direction thereof, wherein the light guide plate and the light output plate are bendable upon application of a pressure at a touch position on the touch panel;
a light source subsystem arranged at the at least one light incident surface and configured to direct light into the light guide plate to provide output light via the plurality of through-openings;
a plurality of interference plates each having two second through-openings in a thickness direction thereof, wherein each of the plurality of interference plates is arranged opposite to a respective one of the plurality of first through-openings such that at least part of the output light exiting from the respective first through-opening passes through the two second through-openings to interfere with each other, and wherein the plurality of interference plates are arranged such that bending of the light guide plate and the light output plate causes a change in a position of a corresponding one of the interference plates upon application of the pressure at the touch position; and
a plurality of detectors each arranged opposite to a respective one of the plurality of interference plates for receipt of the at least part of the output light exiting from the two through-openings of the respective interference plate, wherein each of the plurality of detectors is configured to detect a change in an intensity distribution of the output light, the change in the intensity distribution being caused by the change in the position of the interference plate corresponding to the detector, the change in the position of the interference plate comprising a decrease in a distance from the interference plate to the detector.

* * * * *